US011650986B1

(12) United States Patent
Agbemabiese et al.

(10) Patent No.: US 11,650,986 B1
(45) Date of Patent: May 16, 2023

(54) TOPIC MODELING FOR SHORT TEXT

(71) Applicant: Amazon Technologies, Inc., Seattle, WA (US)

(72) Inventors: Dela K Agbemabiese, Seattle, WA (US); Leonid Razoumov, Bronx, NY (US)

(73) Assignee: Amazon Technologies, Inc., Seattle, WA (US)

( * ) Notice: Subject to any disclaimer, the term of this patent is extended or adjusted under 35 U.S.C. 154(b) by 407 days.

(21) Appl. No.: 16/867,371

(22) Filed: May 5, 2020

(51) Int. Cl.
*G06F 16/2455* (2019.01)
*G06F 16/28* (2019.01)
*G06F 16/33* (2019.01)

(52) U.S. Cl.
CPC ...... *G06F 16/24553* (2019.01); *G06F 16/285* (2019.01); *G06F 16/3347* (2019.01)

(58) Field of Classification Search
None
See application file for complete search history.

(56) References Cited

U.S. PATENT DOCUMENTS

| | | | |
|---|---|---|---|
| 2003/0208485 A1* | 11/2003 | Castellanos ......... | G06F 16/3326 707/999.005 |
| 2016/0110343 A1* | 4/2016 | Kumar Rangarajan Sridhar ........ | G06F 40/216 704/9 |
| 2019/0392078 A1* | 12/2019 | Methani ............... | G06F 16/3347 |
| 2021/0295822 A1* | 9/2021 | Tomkins ............... | G06F 16/328 |

OTHER PUBLICATIONS

Zhang, Xinwei & Bin Wu, "Short Text Classification Based on Feature Extension Using the N-Gram Model", IEEE (2015) 12th International Conference on Fuzzy Systems and Knowledge Discovery (FSKD), pp. 710-716. (Year: 2015).*
Bai, Xiao, et al., "Scalable Query N-Gram Embedding for Improving Matching and Relevance in Sponsored Search", ACM KDD 2018, pp. 52-61. (Year: 2018).*
Lim, Jeongki, et al., "Using Semantically-organized Networks for the Visualization of Short Texts", (2019), 22 pages. (Year: 2019).*
Blei et al., Latent Dirichlet Allocation, Journal of Machine Learning Research 3, Jan. 2003.
Bojanowski et al., Enriching World Vectors with Subword Information, Facebook AI Research, 2017.
McInnes et al., Accelerated Hierarchical Density Clustering, May 25, 2017.
Quan et al., Short and Sparse Text Topic Modeling via Self-Aggregation, IJCAI, 2015.

(Continued)

*Primary Examiner* — Scott A. Waldron
(74) *Attorney, Agent, or Firm* — Knobbe, Martens, Olson & Bear, LLP

(57) ABSTRACT

Systems and methods are directed to a computing device for determining homogeneous groups for search queries. The computing device may generate n-grams for each search query and apply word embedding techniques to calculate representative vectors for each search query. The computing device may train a clustering algorithm using the representative vectors. The computing device may generate topic labels for each cluster and associate each search query in a cluster with the topic label for the cluster.

19 Claims, 6 Drawing Sheets

(56) References Cited

OTHER PUBLICATIONS

Shi et al., Short-Text Topic Modeling via Non-negative Matrix Factorization Enriched with Local Word-Context Correlations, WWW, 2018.
Yan et al., A Biterm Topic Model for Short Texts, WWW, 2013.
Yin et al., A Dirichlet Multinomial Mixture Model-based Approach for Short Text Clustering, KDD, 2014.

* cited by examiner

| Topic/Theme | Search query rank by volume | | | | |
|---|---|---|---|---|---|
| | 1 | 2 | 3 | 4 | 5 |
| Hair Dye | hair dye blonde (23.1%) | turquoise hair dye (10.4%) | honey blonde hair dye (10.1%) | dyebrand hair dye (7.9%) | teal hair dye (3.7%) |
| Hair Spray | hair colour remover (72.4%) | finishing spray hair (3.1%) | hair curl spray (2.0%) | protein spray for hair (1.8%) | hair laquer spray (1.7%) |
| Make Up | make up sets for teenage girls (54.6%) | blushers for cheeks make up (21.5%) | make up headband (3.2%) | make up sharpeners (3.0%) | nude make up (1.9%) |
| Face Wipes & Scrubs | face wipes (79.3%) | sample face wipes (6.0%) | antibacterial face wash (2.2%) | face fillers (1.7%) | expholiating face scrub (1.5%) |
| Face Masks | charcoal face masks (87.7%) | mud masks (1.5%) | face mask for blackheads (1.4%) | pore minimizer mask (1.2%) | hydration masks (1.2%) |
| Shower Gel | shower gel (88.3%) | mens shower gel (5.8%) | shaving gel men (3.2%) | shower gel for women (0.8%) | shower gel 500m (0.5%) |

Fig. 3

TOPIC MODELING FOR SHORT TEXT

BACKGROUND

Businesses are constantly seeking to understand and track consumer behavior to better tailor their products and marketing efforts to what customers want. In the age of online retail, customer search query data may be particularly helpful in understanding the market landscape. Understanding customer search behavior helps brands identify common and latent search interests of current customers and prospective customers. Traditional approaches to obtain the aforementioned insights are arduous and inefficient, as they require a human being to manually evaluate thousands of search queries for relevance. As such, some online retail services have implemented automatic topic modeling systems.

Current topic modeling solutions are based on topic modeling algorithms designed for use with longer documents, not nano-documents or relatively short text strings such as search queries. Further, such models are trained using full-word libraries and are therefore less adept in recognizing vocabulary that does not exactly match the words in the training library, such as misspelled words. In such situations, the misspelled words would be categorized as noise and would not be used in topic generation.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIG. 3 depicts a table illustrating an example set of extracted topics with top search queries within each topic.

DETAILED DESCRIPTION

Figure 1:
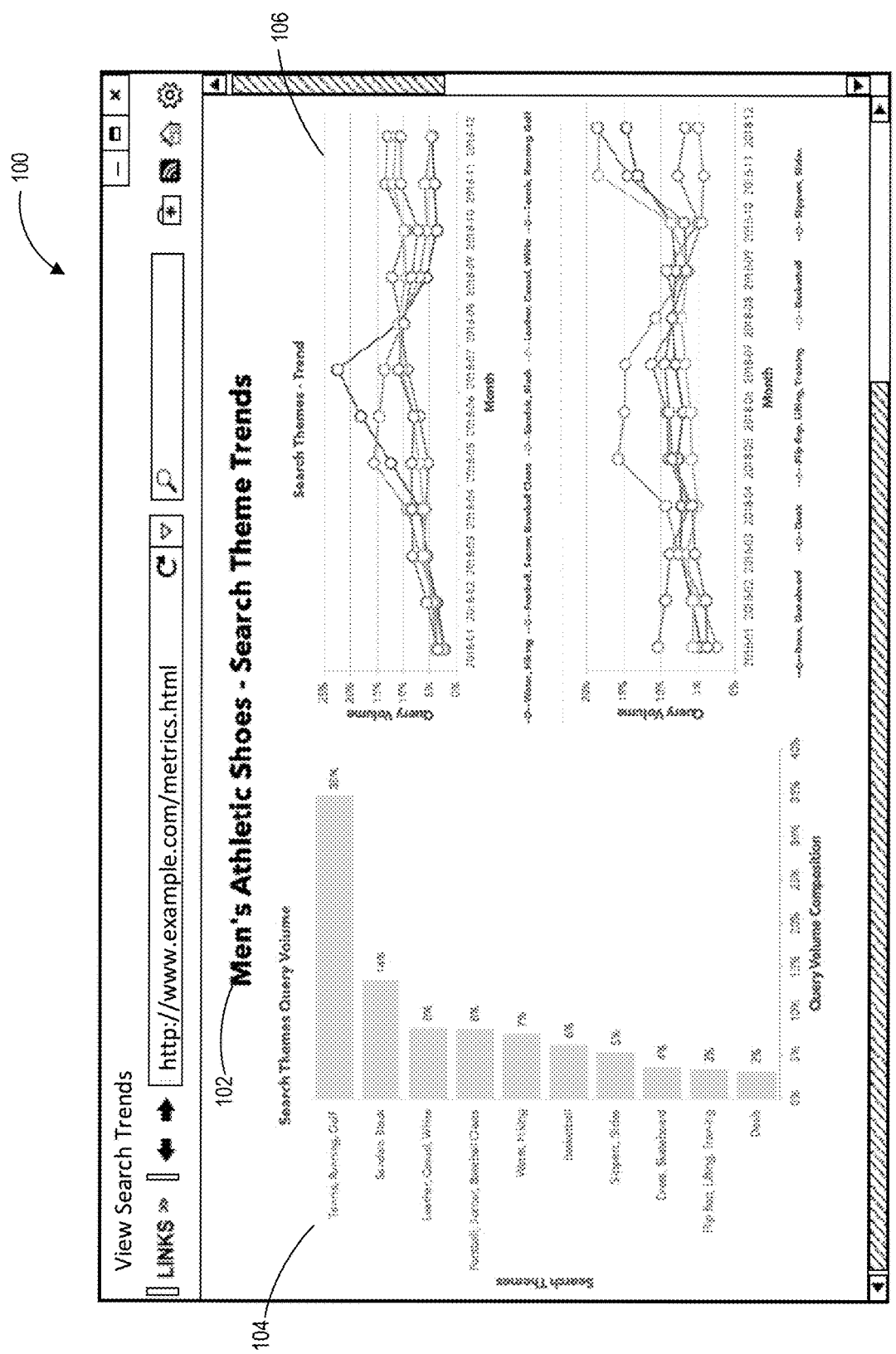
FIG. 1 is a pictorial diagram depicting an example user interface for displaying search query frequency by topic.

Businesses are constantly seeking to understand and track consumer behavior to better tailor their products and marketing efforts to what customers want. In the age of online retail, customer search query data may be particularly helpful in understanding the market landscape. Understanding customer search behavior helps brands identify common and latent search interests of current customers and prospective customers. In particular, merchants may be interested in analyzing customer search queries to track demand cycles for different types of products. In doing so, brands are able to quantify customer search interests, pinpoint research periods to ensure that products are discoverable when they are in season, and highlight relevant search queries to bid on. Traditional approaches to obtain the aforementioned insights are arduous and inefficient, as they require a human being to manually evaluate thousands of search queries for relevance. Instead, an automatic topic modeling system is well-suited to analyze and group such large quantities of search queries into homogeneous groups.

However, current topic modeling solutions are not optimized for use with nano-documents or relatively short text strings such as search queries. For example, the popular topic modeling algorithm Latent Dirichlet Allocation (LDA) performs well for documents with over fifty words, but its performance deteriorates as the number of words reduces. In some suboptimal solutions, several short documents can be combined to form a longer document on which to run the LDA algorithm. However, the decision on which documents to combine together is subjective and not generalizable. Other suboptimal solutions, which are applicable to search query topic analysis, use item descriptions as a substitute for search queries, but this may be unable to explicitly capture customer search behavior. Further, user inputs are prone to misspellings. As described, current topic modeling algorithms are often designed for analysis of longer documents, and as such, may focus on full words. However, one major pitfall to such a model is that the topic modeling algorithm may not be able to recognize words outside of the library on which the algorithm was trained. The topic modeling algorithm may therefore fail to recognize misspelled words. Such failure to recognize misspelled words may lead the topic modeling algorithm to miscategorize meaningful search queries as noise. In the context of this disclosure and topic modeling, noise may refer to search queries that do not explicitly share homogeneity with other search queries.

Aspects of the present disclosure include systems and methods for finding common themes or topics for search queries, and tracking the frequency of themes and their associated search queries. Specifically, a computing system may obtain a set of search queries from local storage or from a data store of search query information. The computing system may then extract a set of themes or topics from the queries. For example, as described in more detail below, the computing system may employ word embedding techniques to generate word vectors based on character n-grams derived from the search queries. Using the word vectors, the computing system may then train a clustering algorithm. Each cluster generated may be assigned a theme or topic, and each search query in the cluster may be associated with the theme or topic. Data relating to frequency of search queries, frequency of search topics, and query-topic associations may then be graphically displayed via a user interface. Generating themes and associating search queries with themes may be done periodically, on demand, or after specified criteria have been met (e.g., after a specified number of new queries have been added to the set of search queries), but need not be done each time a new query is added to the set of search queries.

The present disclosure may improve on traditional topic modeling methods for nano-documents (such as a document or group of text with a small word count, such as a total of one to five words, in one embodiment) and other sparse data sources by using character n-grams. The character n-grams may comprise a different subset of consecutive characters, rather than full words, of the search queries. The present disclosure may assume that each distinct search query is unique, though it may share latent intent with other queries based on the words within the query. For example, if one query is for "black men's shoes" and another query is for "black women's shoes," the shared latent search intent is "black shoes". To capture such latent intents, the computing system employs the letter-based n-gram approach to word embeddings, which may be effective in finding relationships between search queries, thus minimizing the impact of sparsity.

The letter-based n-gram approach used according to aspects of the present disclosure may also be an effective approach to deal with misspellings. Forming n-grams at the character level, converting to vectors, and averaging those vectors may enable the formation of vectors of misspelled words that are within proximity of the properly spelled word vector. Thus, even if a clustering algorithm of the present disclosure encounters a word outside of its training library, the clustering algorithm may still be able to identify the intended search and categorize the search query accordingly. The present disclosure may therefore be robust against misspellings and may reduce the chance of meaningful queries being miscategorized as noise.

By graphically presenting the processed search query data, the computing system may offer at least two distinct practical advantages. The present disclosure may allow merchants to pinpoint peak shopper interest periods to ensure that products are discoverable when they are in season and to invest in relevant high-volume search queries within each theme. By looking at the top search queries within each theme, brands may be able to identify relevant search queries to invest in, even if the queries do not fully align with the products in question. Merchants may also be able to understand how their brands are performing against competitors by analyzing the top queries in a given theme, since search queries may include specific brand language. The present disclosure may thus enable merchants to utilize trends in consumer interest in improving their overall search presence on various retail services or webpages.

The terms "topic" and "theme" are used interchangeably in the present disclosure and illustrations and should be understood to be synonymous in the context of the present disclosure.

The various embodiments will be described in detail with reference to the accompanying drawings. Wherever possible, the same reference numbers will be used throughout the drawings to refer to the same or like parts. References made to the particular examples and implementations are for illustrative purposes, and are not intended to limit the scope of the invention or the claims.

FIG. 1 is a pictorial diagram depicting an example user interface 100 for displaying trends in search query topics. The user interface 100 may be generated, for example, by the network computing device 510 of FIG. 5 described below, and may be displayed on a computing device such as the client computing device 506 of FIG. 5. As shown in FIG. 1, the user interface may include an indication of the product category 102 being viewed. The user interface 100 may also include various graphical representations of frequency data relating to the product category 102. In some embodiments, the user interface 100 may include a frequency chart 104 which shows the search query topic breakdown by volume within the product category 102. The frequency chart may be based at least in part on the number of search queries in a topic grouping. In some embodiments, the user interface 100 may include a topic trend graph 106 which tracks over time search query topic frequency within the product category 102. The topic trend graph may be based at least in part on the number of search queries in a topic grouping and the time at which each search query was submitted. The time information may include both date and time stamps. For both the frequency chart 104 and topic trend graph 106, users may select a specified timeframe such that the graphical representations only use data from the specified timeframe. The timeframe may be divided into user-selectable intervals (e.g. hourly, daily, monthly, etc.). The groupings of queries into topics that may be used in generating graphs such as those displayed will be further described herein. In various embodiments, the user interface 100 may include more or fewer elements than those depicted in FIG. 1.

Figure 2A:
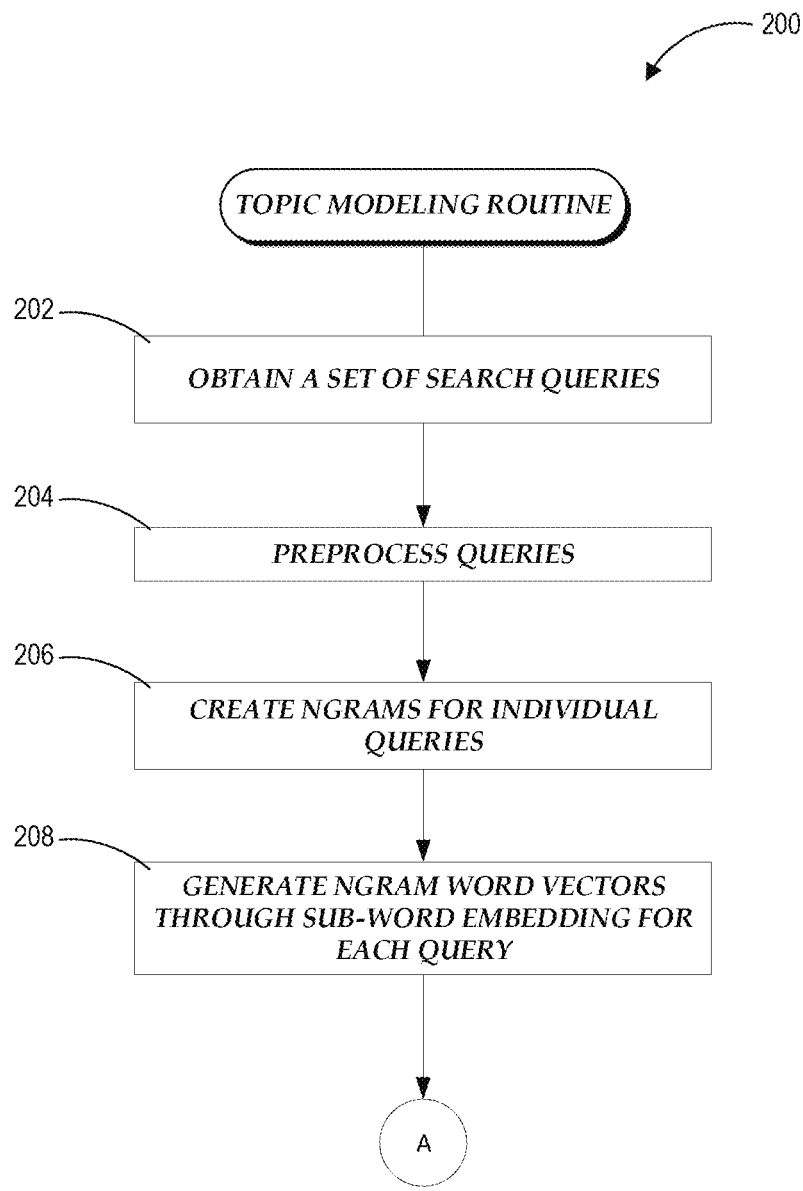
FIGS. 2A and 2B are flow diagrams depicting an illustrative computer-implemented method that may be implemented by a computing device to determine topic labels for each query in a given set of search queries.
Figure 2B:
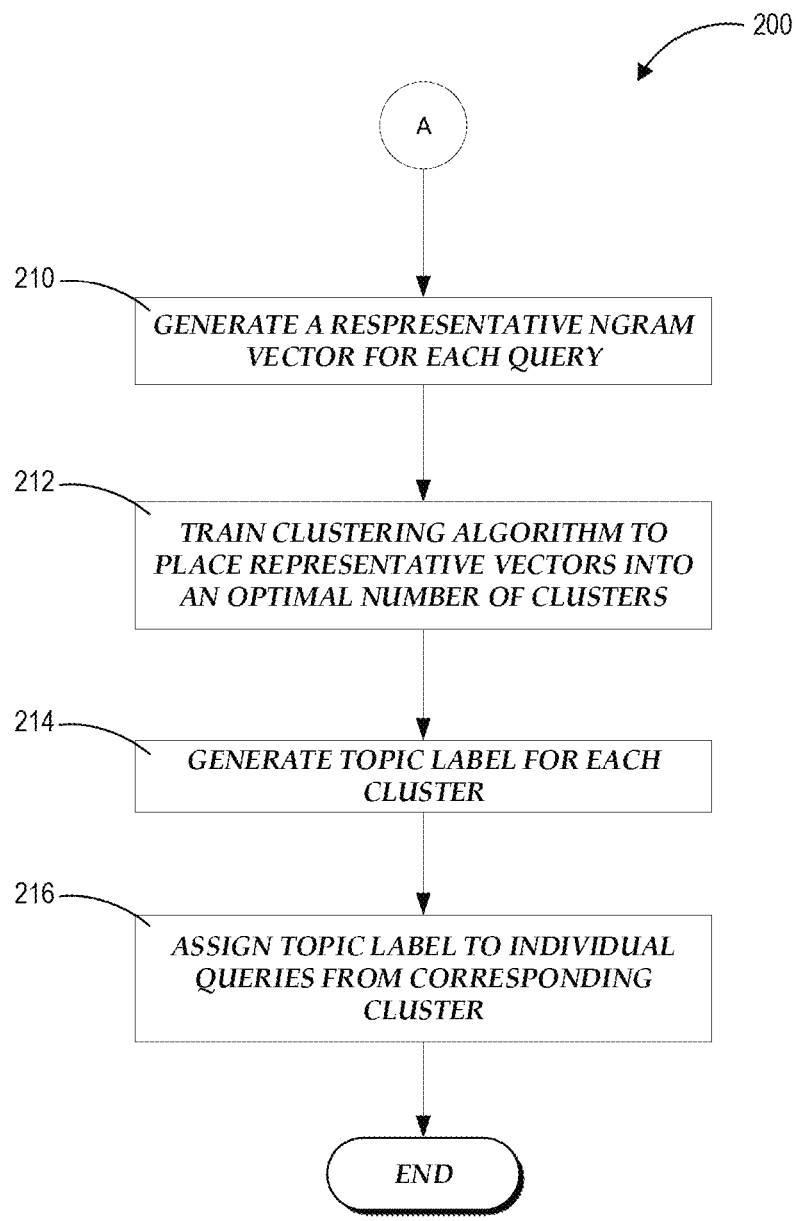

With reference now to FIGS. 2A and 2B, an example topic modeling routine 200 will be described. The routine 200 may be carried out, for example, by the topic modeling module 526 of FIG. 5, which will be described below. At block 202, a set of search queries may be obtained. Illustratively, search queries may be obtained from a data store, such as the search query data store 508 of FIG. 5, or may be obtained from a computing device or devices. The data store or other source from which queries are obtained at block 202 may include, for example, a data source that includes records of thousands or millions of search queries that have been previously submitted by users to search for items or other content available in an electronic catalog or other repository. In some embodiments, the set of search queries obtained at block 202 may be limited to those submitted over a certain time period (such as the past week or month), those submitted by a certain subset of users (such as those located in a certain geographic area, sharing a common language, etc.), and/or those sharing common search options (such as searches limited to particular item categories or having other common filters selected by the searching user).

At block 204, the search queries may be preprocessed. The preprocessing procedure may include known steps and techniques in topic modeling, in some embodiments. The preprocessing step may standardize the set of search queries by eliminating case sensitivity, removing words that do not add value to the topic model, removing special characters, and/or reducing words to their root forms. The preprocessing step may also translate each search query into the language in which the topics will be generated. For example, a search query originally in Spanish may be translated to English during preprocessing if the topic model generated topics in English. The preprocessing procedure may also correct for misspellings, typographical errors, or other human error in the search queries.

At block 206, n-grams may be extracted from individual queries. The extracted n-grams may be character n-grams, where each n-gram comprises a different subset of consecutive characters, rather than full words, appearing in the query. The value of n in the n-gram determination may be configurable or preset. In an example in which n=3, the query "mens shoes" may be represented as <me, men, ens, ns, s s, sh, sho, hoe, oes, es>, partitioned with a rolling window of n characters.

At block 208, n-gram word vectors may be generated through sub-word embedding. Sub-word embedding may apply known word embedding techniques to character n-grams. In some embodiments, the sub-word embedding may use existing word embedding and text classification algorithms that vectorize character n-grams, such as, but not limited to, fastText. At block 210 (shown in FIG. 2B, where the example topic modeling routine 200 is continued), the vectorized character n-grams for each search query may be used to generate a single vector representation for the given query. The representative vector may be generated through several different methods, such as, but not limited to, averaging and weighted averaging. In some embodiments, a given search query's vectors may be averaged such that the query may be represented by an average vector of the vectorized character n-grams for that search query. By averaging the n-gram vectors for a given query, the query's representative vector may be an n-dimensional vector that has been localized within the vector space in a manner such that it will have areas of overlap with related queries' representative vectors. For example, the average vector for "men's shoes" may have an area of overlap with the average vector for "women's shoes," which may result in these queries being clustered together in later steps of the method described below. Representative vectors may be formed from preprocessed versions of the original queries (such as "mens shoes" rather than "men's shoes," as was entered by the original searching user).

At block 212, a clustering algorithm may be trained, using the representative vectors generated in block 210, to place the representative vectors into an optimal number of clusters. The optimal number of clusters may be determined as part of the training process, and may also be considered to represent an optimal number of topics represented in the queries. The representative vectors used to train the clustering algorithm may include the representative vectors for every query in the set of search queries. The training process may be considered a clustering of individual search queries, where each query is represented in the clustering process by that query's representative vector generated at block 210 above. In some embodiments, the clustering algorithm may employ Hierarchical Density-Based Spatial Clustering of Applications with Noise (HDBSCAN) techniques. Use of HDBSCAN techniques may provide benefits such as identifying word embeddings with heavy overlap in particular areas, identifying a noisy cluster (which may be excluded from topic labeling, or marked as a "miscellaneous" topic), and enabling adjustment of a noise threshold.

The optimal number of topics may be pre-determined and manually set, or it may be automatically generated through hierarchical clustering or other such automatic clustering techniques. Each cluster may be associated with one topic label such that the optimal number of topics may correspond with the number of clusters to be generated by the clustering algorithm.

In block 214, topic labels may be generated for each cluster. Topics labels may be based at least in part on words which appear the most frequently within the search queries in the cluster. Topic labels may be one word long or may comprise several words, where the maximum word count of a topic label may be predetermined. Topic label word order may be automatically determined based at least in part on the order in which the topic label words most frequently appear in search queries. In one embodiment, the topic label for a cluster may be formed by identifying the two or three most frequently occurring words within queries in the cluster, then arranging those words in an order in which they have actually appeared in one or more search queries. In another embodiment, a single representative query, such as a centroid query within the cluster or frequently submitted query in the cluster, may be used as the topic label.

In block 216, queries within a cluster may each be assigned the topic label associated with the cluster. Each search query may typically be associated with one cluster and therefore one topic, though the presently disclosed system may permit search queries to be associated with more than one topic. The topic-query association may be provided to a module such as the user interface module 522 of FIG. 5 for display, stored in a data store (with the search queries, search query frequency data, any other data relating to the search queries, or separately), or utilized by another routine or process.

One skilled in the art will appreciate that the blocks of routine 200 may be varied, combined, or separated within the scope of the present disclosure.

FIG. 3 depicts a search query frequency table 300 containing topics 302 and search query rankings 304 within each topic. In generating a frequency table such as the one illustrated, search queries may be analyzed in the manner described in FIGS. 2A and 2B to generate topics 302 and to associate each search query with at least one topic. Each search query may be ranked according to its frequency with respect to all search queries associated with a given topic. Although the illustration lists search query rankings 304 for the top five most frequently submitted search queries, the presently disclosed system may rank all search queries associated with a topic. Search queries may contain brand names 306 or other such unique identifiers specific to one company or manufacturer. The search query frequency table 300 may also list faulty query entries 308 that contain spelling mistakes, typographical errors, or other human error. The system described in the present disclosure may nonetheless identify the intended search from the faulty query entry 308 and may associate the faulty query entry 308 with a topic 302 based on the identified intended search.

Figure 4:
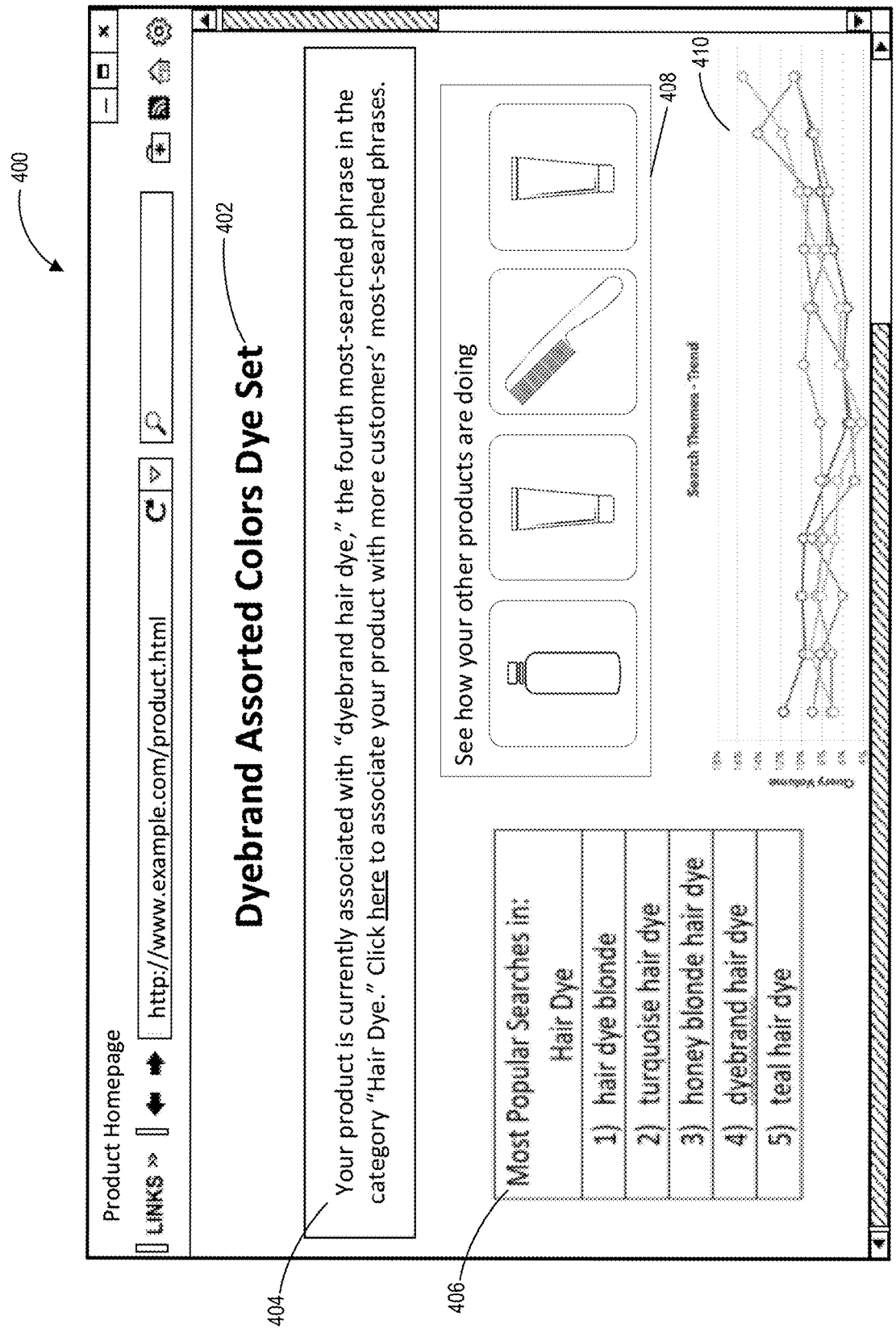
FIG. 4 is a pictorial diagram depicting an example user interface for displaying the effectiveness of search query associations with a particular product.

FIG. 4 is a pictorial diagram depicting an example query performance page 400 displaying the effectiveness of search query associations with a specific product 402. The query performance page 400 may be a webpage dedicated to showing search queries and search query trends related to the specific product 402, which may be displayed to a brand manager, marketer, or other user associated with a manufacturer or seller of the product 402. In some embodiments, the query performance page 400 may include a popular searches list 406 and a topic trend graph 410. Like the table illustrated in FIG. 3, the popular searches list 406 may display a ranked list of top search queries for the topic with which the specific product 402 is associated. The topic trend graph 410 may track over time the frequency with which the specific product's topic is searched. In some embodiments, the query performance page 400 may also include a product navigation panel 408 from which a merchant or other user viewing the page may access the query performance page for another of the merchant's products. In some embodiments, the query performance page 400 may include a message to inform the merchant with which popular search query the specific product 402 is currently associated, such as via keyword associations, bidding to appear as a sponsored search result for a query, or otherwise. In some embodiments, the query performance page 400 may include an input area or a link to a different interface containing an input area where the merchant may request that the specific product 402 be associated with certain search queries. In various embodiments, the query performance page 400 may include more or fewer elements than those depicted in FIG. 4.

In some embodiments, the query performance page 400 may be displayed on a mobile computing device or another device with a limited screen size. In these embodiments, a network computing device or the mobile computing device may determine the number of popular search queries and other merchant products to display in the query performance page 400 based on the limited screen size. For example, a network computing device, such as the network computing device 510 of FIG. 5, may determine that the query performance page 400 will be displayed on a client computing device screen with an effective size of 480 pixels by 320 pixels. The network computing device 510 may thus generate instructions to render the query performance page 400 within that screen size, and may determine a number of popular search queries and other merchant products that can be displayed within the screen size.

Figure 5:
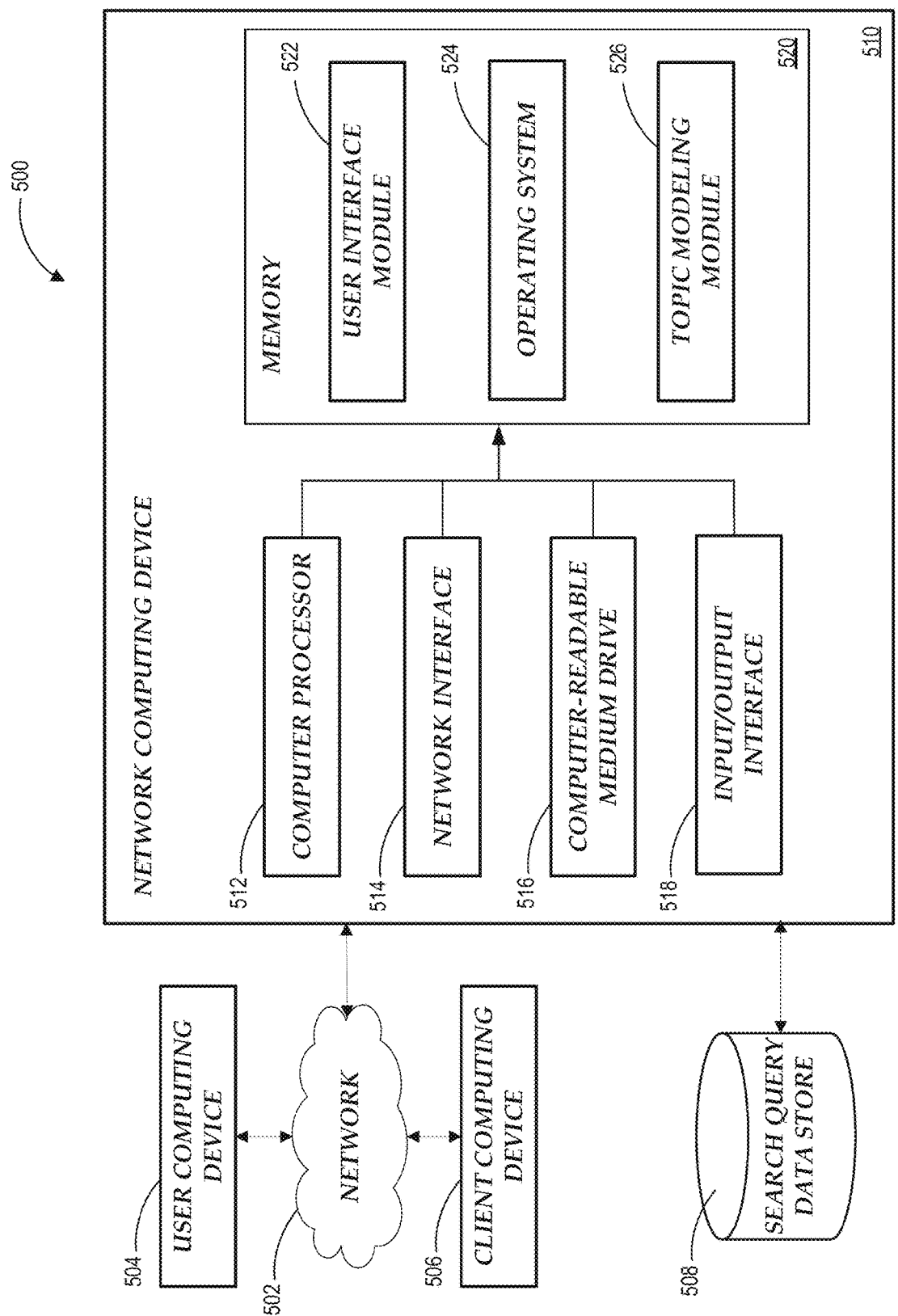
FIG. 5 is a block diagram of an illustrative network computing device that determines topic labels for search queries, analyzes search trends for the topic labels, analyzes search query trends within the topics labels, and provides the analyses to a computing device for presentation in a user interface, such as the example user interface depicted in FIG. 1.

FIG. 5 is a block diagram depicting an illustrative operating environment 500 including a network computing device 510 that determines topic labels for search queries, tracks frequency trends in topics and queries, and provides the frequency trend data to a client computing device 506 for presentation in a user interface. The client computing device 506 may communicate with the network computing device 510 via a network 502. The environment 500 may further include a user computing device 504, which may communicate with the network computing device 510 via a network 502, and from which the network computing device 510 receives search queries. The search queries may subsequently be stored in the search query data store 508. As non-limiting examples, the user computing device 504 and client computing device 506 each may be a personal computing device, laptop computing device, handheld computing device, terminal computing device, mobile device (e.g., a mobile phone or tablet computing device), wearable device configured with network access and program execution capabilities (e.g., "smart eyewear" or a "smart watch"), wireless device, electronic reader, media player, home entertainment system, gaming console, set-top box, television configured with network access and program execution capabilities (e.g., "smart TV"), or some other electronic device or appliance. For ease of description, the environment 500 is illustrated as including one user computing device 504, one client computing device 506, and one network computing device 510. However, the environment 500 may include one or more user computing devices, one or more client computing devices, one or more network computing devices without loss of generality.

In the environment 500, the client computing device 506 may communicate with the network computing device 510 by exchanging data and other information via a network 502. The network 502 may be any wired network, wireless network, or combination thereof. In addition, the network 502 may be a personal area network, local area network, wide area network, cable network, satellite network, cellular telephone network, etc. or combination thereof. In further addition, the network 502 may be a personal area network, local area network, wide area network, over-the-air broadcast network (e.g., for radio or television), cable network, satellite network, cellular telephone network, or combination thereof. For example, the network 502 may be a publicly accessible network of linked networks, possibly operated by various distinct parties, such as the Internet. In some embodiments, the network 502 may be private or semi-private networks, such as a corporate or university intranets. The network 502 may include one or more wireless networks, such as a Global System for Mobile Communications (GSM) network, a Code Division Multiple Access (CDMA) network, a Long Term Evolution (LTE) network, or some other type of wireless network. The network 502 may use protocols and components for communicating via the Internet or any of the other aforementioned types of networks. Protocols and components for communicating via the Internet or any of the other aforementioned types of communication networks are well known to those skilled in the art and, thus, are not described in more detail herein.

In some embodiments, the network 502 may route or forward requests for frequency trend data of search queries or search topics (or network pages that include frequency trend data of search queries or search topics) from the client computing device 506 to the network computing device 510. In response, the network computing device 510 may receive and respond to the requests by sending such responses via the network 502.

In some embodiments, the network computing device 510 may be in communication with a search query data store 508, which may store one or more search queries that the network computing device 510 may provide to the client computing device 506 on request. For example, the search query data store 508 may store search queries, search frequency information for each query, topics associated with each query, and the like. The search query data store 508 may be local or remote to the network computing device 510, and/or may be a network-based service itself. The search query data store 508 may be embodied in hard disk drive, solid state memories, any other type of non-transitory computer-readable storage medium, and/or a file, database, relational database, in-memory cache, and/or stored in any such non-transitory computer-readable medium accessible to the network computing device 510. The search query data store 508 may also be distributed or partitioned across multiple local and/or storage devices without departing from the spirit and scope of the present disclosure. In some embodiments, some or all of the above search query information may be stored locally on the network computing device 510.

In some embodiments (not shown in FIG. 5), the client computing device 506 may send requests to the network computing device 510 through one or more proxy servers. In such embodiments, the one or more proxy servers may receive the requests from the client computing device 506 and may forward these requests to the network computing device 510. Similarly, the one or more proxy servers may receive responses from the network computing device 510 and may forward those responses to the client computing device 506.

FIG. 5 further depicts a general architecture of the network computing device 510, which includes an arrangement of computer hardware and software components that may be used to implement aspects of the present disclosure. The network computing device 510 may include many more (or fewer) elements than those shown in FIG. 5. It is not necessary, however, that all of these elements be shown in order to provide an enabling disclosure.

As illustrated, the network computing device 510 includes a processor 512, a network interface 514, a computer-readable medium drive 516, and an input/output device interface 518, all of which may communicate with one another by way of a communication bus. The network interface 514 may provide connectivity to one or more networks (e.g., the network 502) or computing systems and, as a result, may enable the network computing device 510 to receive and send information and instructions from and to other computing systems or services. For example, the network computing device 510 may receive requests for search query trends from the client computing device 506 via the network interface 514, and the processor 512 may, in response, send a set of representative search query trends to the requesting client computing device 506 over the network 502 using the network interface 514.

The processor 512 may also communicate to and from a memory 520. The memory 520 may contain computer program instructions (grouped as modules or components in some embodiments) that the processor 512 may execute in order to implement one or more embodiments. The memory 520 generally includes RAM, ROM, and/or other persistent, auxiliary, or non-transitory computer-readable media. The memory 520 may store an operating system 524 that provides computer program instructions for use by the processor 512 in the general administration and operation of the network computing device 510. The memory 520 may further include specific executable computer program instructions and other information (which may be referred to herein as "modules") for implementing aspects of the present disclosure. For example, in some embodiments, the memory 520 may include a user interface module 522 and a topic modeling module 526, which may be executed by the processor 512 to perform various operations, such as those operations described with reference to FIGS. 1, 2A, 2B, and 4.

In some embodiments, the user interface module 522 and topic modeling module 526 may implement various aspects of the present disclosure. For example, the topic modeling module 526 may generate topics from a set of search queries (e.g., as described above and with reference to FIGS. 2A and 2B). As a further example, the user interface module 522 may generate a user interface to display search query frequency data and search topic trends (e.g., as described above and with reference to FIGS. 1 and 4).

Additionally, in some embodiments, the user interface module 522 and topic modeling module 526 may be implemented by one more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "cloud" computing environment.

While the user interface module 522 and topic modeling module 526 are illustrated as distinct modules in the memory 520 in some embodiments, the user interface module 522 and topic modeling module 526 may be incorporated as modules in the operating system 524 or another application or module, and as such, separate modules may not be required to implement some embodiments. In some embodiments, the user interface module 522 and/or topic modeling module 526 may be implemented as part of a common web service (e.g., an HTTP web service).

It will be recognized that many of the devices described above are optional and that embodiments of the environment 500 may or may not combine devices. Furthermore, devices need not be distinct or discrete. Devices may also be reorganized in the environment 500. For example, the network computing device 510 may be represented in a single physical server or, alternatively, may be split into multiple physical servers. In some embodiments, the network computing device 510 may be implemented as a client computing device 506. Additionally, in some embodiments, the environment 500 may not include a network 502.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of identifying common topics across queries, the method comprising:
    as implemented by one or more computing devices configured with specific computer-executable instructions,
        obtaining a first query, wherein the first query was previously submitted by a user in association with a search request;
        creating a plurality of n-grams from the first query that each include less characters than the first query, wherein each of the n-grams comprises a different two or more consecutive characters appearing in the first query;
        generating word vectors for the first query based at least in part by applying word embedding methods to the plurality of n-grams from the first query;
        averaging the word vectors to obtain a first average vector representing the first query;
        training a clustering algorithm using the first average vector and a plurality of other average vectors generated for additional queries, wherein at least one cluster is output as a result of the training;
        generating a topic label for each cluster, wherein the topic label for each individual cluster is generated to include, within the topic label for the individual cluster, one or more words that each appear within multiple queries in the individual cluster; and
        assigning a first topic label to at least the first query, wherein the first topic label assigned to the first query is the topic label generated for a cluster that includes the first query.

2. The computer-implemented method of claim 1 further comprising:
    generating frequency data for the at least one cluster, wherein the frequency data is based at least in part on a number of queries appearing in the at least one cluster and the time at which the queries were submitted;
    generating and transmitting, to a client device, a user interface with a visual representation tracking topic label frequency over time, wherein the topic label frequency is for a topic label assigned to the at least one cluster and is based at least in part on the frequency data for the at least one cluster.

3. The computer-implemented method of claim 1, wherein the clustering algorithm applies hierarchical density-based spatial clustering.

4. The computer-implemented method of claim 1, further comprising determining an optimal number of topic labels by applying hierarchical clustering.

5. A computing system comprising:
    a memory configured to store processor-executable instructions; and
    a processor in communication with the memory and configured to execute the processor-executable instructions to perform operations comprising:
        obtaining a first query;
        creating a plurality of n-grams from the first query that each include less characters than the first query;
        generating word vectors for the first query based at least in part on the plurality of n-grams from the first query;
        generating a first representative vector representing the first query based on the word vectors;
        generating a plurality of clusters of queries, wherein the plurality of clusters are generated based at least in part by training a clustering algorithm using the first representative vector and a plurality of other representative vectors generated for additional queries;
        generating a topic label for each of the plurality of clusters, wherein the topic label for each individual cluster is generated to include, within the topic label for the individual cluster, one or more words that each appear within multiple queries in the individual cluster; and
        assigning a first topic label to at least the first query, wherein the first topic label assigned to the first query is the topic label generated for a cluster that includes the first query.

6. The system of claim 5, wherein the operations further comprise generating and transmitting, to a client device, a user interface with a visual representation of topic label frequency within a product category, wherein the topic label frequency for a selected topic label is based at least in part on a number of queries appearing in a cluster associated with the selected topic label.

7. The system of claim 5, wherein generating the plurality of clusters comprises splitting a cluster that becomes unstable.

8. The system of claim 5, wherein one cluster is identified as representing noise rather than a topic.

9. The system of claim 5, wherein the operations further comprise generating a ranked list of queries in at least one cluster, based at least in part on a number of times that users submitted individual queries appearing in the at least one cluster over a time period.

10. The system of claim 9, wherein the queries are ranked according to a frequency of appearance within a topic label.

11. The system of claim 5, wherein the topic label for an individual cluster is based at least in part on one or more most frequently used words from queries in the individual cluster.

12. The system of claim 5, wherein the operations further comprise identifying that an item is associated with the first query.

13. The system of claim 12, wherein the operations further comprise:
   determining that the item has not been associated with a second query that is in the cluster that includes the first query; and
   sending a recommendation, to a client device, to further associate the item with at least the second query, wherein the recommendation identifies that the second query is associated with the first topic label.

14. A non-transitory, computer-readable medium having stored thereon computer-executable instructions configured to cause a processor of a computing device to perform operations comprising:
   obtaining a first query;
   creating a plurality of n-grams from the first query that each include less characters than the first query;
   generating a plurality of vectors for the first query based on the plurality of n-grams;
   generating a first representative vector representing the first query based on the plurality of vectors for the first query;
   generating a plurality of clusters of queries, wherein the plurality of clusters are generated based at least in part by training a clustering algorithm using the first representative vector for the first query and a plurality of other representative vectors generated for additional queries;
   generating a topic label for each cluster of at least a subset of the plurality of clusters, wherein the topic label for each individual cluster of the subset is generated to include, within the topic label for the individual cluster, one or more words that each appear within multiple queries in the individual cluster; and
   assigning a first topic label to at least the first query, wherein the first topic label assigned to the first query is the topic label generated for a cluster that includes the first query.

15. The non-transitory, computer-readable medium of claim 14, wherein the computer-executable instructions further comprise generating and transmitting, to a client device, a user interface with a visual representation of query frequency within an individual topic label, wherein the query frequency is based at least in part on a number of times that users submitted individual queries appearing in a cluster associated with the individual topic label.

16. The non-transitory, computer-readable medium of claim 14, wherein the first representative vector comprises one of (a) an average of the plurality of vectors for the first query or (b) a weighted average of the plurality of vectors for the first query.

17. The non-transitory, computer-readable medium of claim 14, wherein the first query is received from a user device.

18. The non-transitory, computer-readable medium of claim 14, wherein obtaining the first query comprises:
   accessing a search query data store that stores a plurality of queries submitted by a plurality of users to search an electronic catalog for items; and
   retrieving the first query from the search query data store.

19. The non-transitory, computer-readable medium of claim 14, wherein the topic label generated for the cluster that includes the first query is selected based on words appearing in a centroid query of the cluster that includes the first query.

* * * * *